United States Patent
Yasuda

(10) Patent No.: US 11,812,733 B2
(45) Date of Patent: Nov. 14, 2023

(54) BRAKING DEVICE THAT BRAKES SPOOL AND FISHING REEL PROVIDED WITH THE SAME

(71) Applicant: GLOBERIDE, Inc., Tokyo (JP)

(72) Inventor: Hiromu Yasuda, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/890,066

(22) Filed: Aug. 17, 2022

(65) Prior Publication Data
US 2023/0068900 A1 Mar. 2, 2023

(30) Foreign Application Priority Data

Aug. 26, 2021 (JP) ................................. 2021-137785

(51) Int. Cl.
*A01K 89/01* (2006.01)
*A01K 89/033* (2006.01)
*A01K 89/0155* (2006.01)

(52) U.S. Cl.
CPC ........ *A01K 89/056* (2015.05); *A01K 89/0155* (2013.01)

(58) Field of Classification Search
CPC .............. A01K 89/056; A01K 89/0155; A01K 89/01555; A01K 89/017; A01K 89/0186; A01K 89/05; A01K 89/01928
See application file for complete search history.

(56) References Cited

U.S. PATENT DOCUMENTS

| | | | | |
|---|---|---|---|---|
| 5,692,693 A | * | 12/1997 | Yamaguchi | A01K 89/01555 242/288 |
| 6,126,105 A | * | 10/2000 | Yamaguchi | A01K 89/01555 188/164 |
| 2004/0140163 A1 | | 7/2004 | Ikuta et al. | |
| 2004/0208633 A1 | | 10/2004 | Akashi et al. | |
| 2009/0026300 A1 | * | 1/2009 | Tsutsumi | A01K 89/01555 242/288 |
| 2013/0037645 A1 | * | 2/2013 | Niitsuma | A01K 89/01555 242/288 |

(Continued)

FOREIGN PATENT DOCUMENTS

| | | | | |
|---|---|---|---|---|
| JP | H0717065 U | * | 3/1995 | ........... A01K 89/017 |
| JP | 2001095438 A | * | 4/2001 | |

(Continued)

*Primary Examiner* — Emmanuel M Marcelo
(74) *Attorney, Agent, or Firm* — K&L Gates LLP

(57) ABSTRACT

A braking device of a double bearing reel according to one embodiment of the present disclosure brakes a spool rotatably mounted on a reel body, the braking device provided with a braked unit attached to the spool, a braking unit that applies a braking force to the braked unit, an output shaft that adjusts the braking force of the braking unit according to a rotational angle, a motor capable of driving the output shaft in forward and backward directions, a reduction mechanism that transmits power while decelerating from the motor to the output shaft, a control unit that controls the motor, and a power supply that supplies electric power to the motor, the braking device provided with a watertight case that houses the motor, the reduction mechanism, the control unit, and the power supply in a watertight manner, and a waterproof unit for waterproofing on the output shaft.

5 Claims, 8 Drawing Sheets

(56) References Cited

U.S. PATENT DOCUMENTS

2017/0172131 A1\* 6/2017 Toake .................... A01K 89/05
2023/0068397 A1\* 3/2023 Yasuda ................ A01K 89/033
2023/0138979 A1\* 5/2023 Yasuda .................... H05K 5/06
                                                            242/310

FOREIGN PATENT DOCUMENTS

| JP | 2004208633 A |   | 7/2004  |               |
|----|--------------|---|---------|---------------|
| JP | 2014183763 A | \* | 10/2014 | ......... A01K 89/0192 |
| KR | 20190038285 A | \* | 4/2019  | ........... A01K 89/015 |

\* cited by examiner

BRAKING DEVICE THAT BRAKES SPOOL AND FISHING REEL PROVIDED WITH THE SAME

CROSS-REFERENCE TO RELATED APPLICATIONS

This application claims priority under 35 U.S.C. § 119 to Japanese Patent Application No. 2021-137785 filed on Aug. 26, 2021, in the Japanese Patent Office, the entire contents of which is hereby incorporated by reference.

BACKGROUND

The present disclosure relates to a braking device provided with a waterproof mechanism, especially a braking device of a double bearing reel that brakes a spool rotatably mounted on a reel body, and a fishing reel provided with the same.

FIELD

Conventionally, a braking device that brakes a spool for preventing backlash at the time of casting (throwing) is provided on a double bearing reel, especially a bait casting reel in which a device such as a lure is mounted on a tip of a fishing line for casting (throwing).

Some braking devices of this type may electrically adjust a braking force. JP 2004-208633 A discloses a braking device of a double bearing reel that brakes a spool rotatably mounted on a reel body, the braking device of the double bearing reel provided with a spool braking means including a rotor including a plurality of magnetic poles having alternately different polarities arranged side by side in a rotational direction, the rotor rotating in conjunction with the spool, a plurality of coils mounted on the reel body at intervals in a circumferential direction around the rotor and connected in series, and a switch means connected to both ends of the plurality of coils connected in series, the spool braking means that brakes the spool, a spool control means including a circuit board mounted on the reel body to which the plurality of coils is attached, and a control element mounted on the circuit board, the spool control means that electrically controls the spool braking means, a first synthetic resin film made of an insulator that covers the coils, and a second synthetic resin film made of an insulator that covers the spool control means. In such braking device, in order to realize waterproofing of a circuit unit that electrically controls a braking force, waterproofing of a control circuit has been realized by housing the coil and circuit in a waterproof structure.

SUMMARY

In JP 2004-208633 A, a principle of applying the braking force to the spool is referred to as a power generation brake. That is, kinetic energy is converted into electric energy by a power generation effect of a magnet provided on the spool and a coil provided on a stator.

In contrast, as a principle of applying the braking force to the spool, an eddy current type brake, a frictional brake and the like has been devised. In the eddy current type brake, a magnetic field is applied from a magnetic circuit using a permanent magnet and the like provided on the stator to a conductive member provided on the spool to generate an eddy current, thereby applying the braking force. In the frictional brake, the braking force is applied by generating a Coulomb frictional force by applying a contact force from the outside to a braking unit provided on the spool.

The braking device using these principles has an advantageous characteristic not found in the power generation brake type; for example, lower inertia of the spool than that in the power generation brake type may be realized, and the braking force may be generated even when the control circuit is disconnected. However, in order to electrically control the braking force by these methods, it is necessary to transmit a mechanical force to the outside of the watertight structure, and it is difficult to realize the waterproof structure.

The present disclosure is achieved in view of the above-described circumstances, and an object thereof is to provide a braking device capable of realizing a waterproof structure of the braking device by a method other than a power generation brake type, and a fishing reel provided with the same. Other objects of the present disclosure will become apparent by reference to the entire specification.

A braking device of a double bearing reel according to one embodiment of the present disclosure brakes a spool rotatably mounted on a reel body, the braking device provided with a braked unit attached to the spool, a braking unit that applies a braking force to the braked unit, an output shaft that adjusts the braking force of the braking unit according to a rotational angle, a motor capable of driving the output shaft in forward and backward directions, a reduction mechanism that transmits power while decelerating from the motor to the output shaft, a control unit that controls the motor, and a power supply that supplies electric power to the motor, the braking device provided with a watertight case that houses the motor, the reduction mechanism, the control unit, and the power supply in a watertight manner, and a waterproof unit for waterproofing on the output shaft.

In the braking device of the double bearing reel according to one embodiment of the present disclosure, the braked unit is a conductor, and the braking unit is a magnetic circuit formed of a permanent magnet, and the output shaft changes a magnetic field to the conductor by moving at least a part of the magnetic circuit.

In the braking device of the double bearing reel according to one embodiment of the present disclosure, the braked unit is a frictional member, the braking unit is a frictional braking unit that transmits a contact force to the frictional member, and the output shaft changes a contact force according to rotation.

In the braking device of the double bearing reel according to one embodiment of the present disclosure, the watertight case further houses at least any one of a rotation detection unit that detects rotation of the spool, a position detection unit that detects a position of a reduction gear of the reduction mechanism, or a clutch state detection unit that detects a state of a clutch of the fishing reel.

A fishing reel according to one embodiment of the present disclosure is provided with the braking device of the double bearing reel according to any one of the above.

According to the above-described embodiment, it becomes possible to provide a braking device capable of realizing waterproofing of a control circuit capable of electrically adjusting a braking force, and a fishing reel provided with the same.

DETAILED DESCRIPTION

Hereinafter, an embodiment of a braking force control device and a fishing reel provided with the same according to the present disclosure is specifically described with reference to the accompanying drawings. Components common in a plurality of drawings are assigned with the same reference signs throughout the plurality of drawings. Note that, the drawings are not necessarily drawn to scale for convenience of description.

A braking device of a double bearing reel and a fishing reel provided with the same according to one embodiment of the present disclosure are described with reference to FIGS. 1 to 5.

Figure 1:
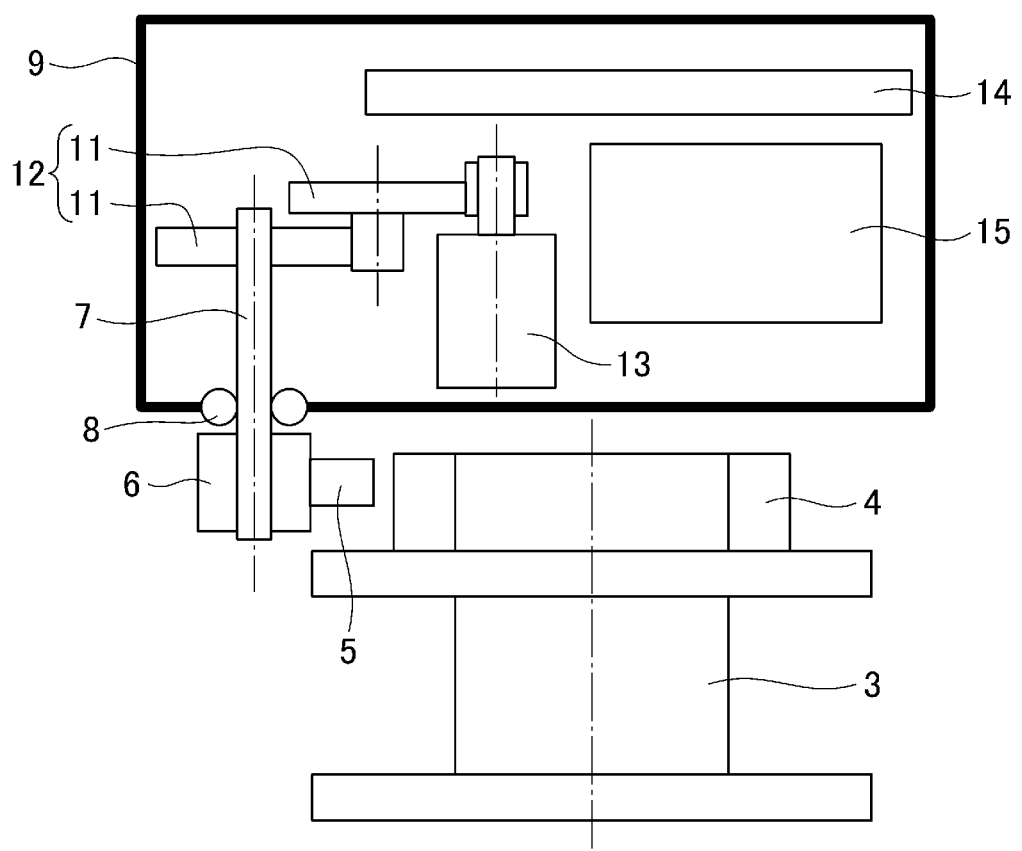
FIG. 1 is a view for illustrating a waterproof structure in a fishing reel provided with a braking device according to one embodiment of the present disclosure.
Figure 5:
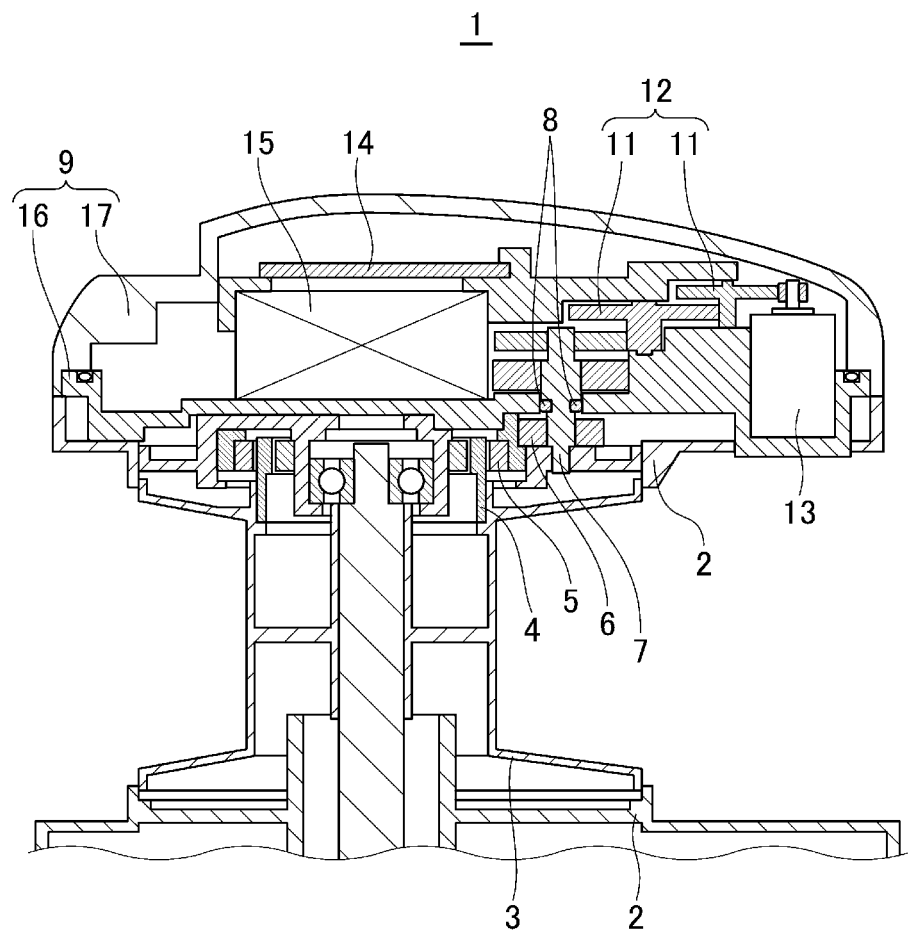
FIG. 5 is a cross-sectional view of the fishing reel provided with the braking device according to one embodiment of the present disclosure.

First, FIG. 1 is a schematic diagram for illustrating a waterproof structure in a fishing reel 1 provided with a braking device 10 according to one embodiment of the present disclosure, and FIG. 5 is a cross-sectional view of the fishing reel 1 provided with the braking device 10 according to one embodiment of the present disclosure for illustrating the waterproof structure.

As illustrated in FIGS. 1 and 5, the fishing reel 1 according to one embodiment of the present disclosure is formed of a frame (reel body) 2, a spool 3, a braked unit (braked means) 4, a braking unit (braking means) 5, an output member (output means or output mechanism) 6, an output shaft 7, a waterproof unit (waterproof means or waterproof member) 8, a watertight case (waterproof case) 9, a reduction mechanism 12 including a reduction gear 11, a motor 13, a board 14, and a battery 15.

Herein, the spool 3 is supported so as to be rotatable with respect to the reel body 2, and may wind a fishing line on an outer periphery thereof by rotating in a forward direction. When casting (throwing) a lure and the like, this may release the wound fishing line by rotating in a backward direction. When a release amount of the fishing line is too large at that time, line entanglement referred to as backlash occurs and hinders normal use of the fishing reel 1. It is possible to prevent the backlash by applying an appropriate braking force by the braking unit 5 to be described later.

The braked unit 4 is fixed to the spool 3 and receives the braking force by the braking unit 5. The output member 6 may adjust the braking force applied to the braked unit 4 by the braking unit 5 by rotating at least a part of the braking unit 5. Since a structure thereof varies depending on a method of the braking unit, it is described later in detail. The output member 6 is supported so as to be rotatable about the output shaft 7 as a central axis. One end or a part (first portion) of the output shaft 7 is housed in the watertight case 9 to be described later, and the other end or a part (second portion) of the output shaft 7 is arranged outside the watertight case.

By providing the waterproof member 8 at a site where the output shaft 7 penetrates the watertight case 9, it is possible to waterproof the inside of the watertight case 9. As the waterproof member 8, it is possible to achieve both rotatable support of the output shaft and waterproofing of the watertight case by a known means such as waterproof packing such as an O-ring or a waterproof seal using magnetic fluid. The waterproof member 8 is not limited thereto, and other known technologies may also be used.

Herein, as the motor 13, a motor without a waterproof function is used in consideration of cost and volume. Normally, even if the motor 13 is subjected to waterproof treatment, it is difficult to waterproof a gap between a body and a shaft core of the motor 13. It is possible to enhance a waterproof property by providing a waterproof means such as an O-ring that narrows this gap; however, since a torque loss occurs due to friction generated between the body and the shaft core by this, a relationship between the waterproof property and the torque is in a trade-off relationship. In order to solve this problem, the reduction gear 11 is installed between the shaft core of the motor and the output shaft 7. As a result, the reduction gear 11 compensates for the torque loss caused by the waterproof unit 8. Furthermore, the braked unit 4 may be braked with less electric power.

The output shaft 7 receives power transmission from the motor 13 via the reduction mechanism 12 such as the reduction gear 11. The motor 13 is electrically connected to the board 14 including a microcomputer and a motor driver, and may receive an instruction of forward/backward rotation as necessary to locate the output shaft 7 at a predetermined position. At that time, a position sensor (not illustrated) may be provided in a part of the reduction gear 11, and the motor 13 may be feedback-controlled by receiving an output signal thereof by the microcomputer. The battery 15 supplies electric power to the motor 13 and a control circuit.

The watertight case 9 is formed of, for example, a box member 16 and a lid member 17, and by hermetically fixing the box member 16 and the lid member 17, entry of water or other substances into the interior of a component housed therein is prevented. In a case where the watertight case 9 is formed of the box member 16 and the lid member 17, a connection between the box member 16 and the lid member 17 may prevent entry of water and other substances from the outside into a loop by a waterproof joint member (waterproof joint means) realized by a packing member such as an O-ring, a waterproof double-sided tape, a laser welded portion, a seal box structure, waterproof grease and the like provided as a closed loop over an entire circumference. The motor 13, the reduction gear 11, the board 14, and the battery 15 may be housed in an internal space formed in this manner. A position sensor that detects a position of the reduction gear described above and a rotation sensor that detects rotation of the spool may be arranged in the internal space. As a result, it is possible to house a plurality of parts that requires waterproof treatment in one watertight structure, so that it is possible to avoid an increase in size of an entire device.

Figure 2A:
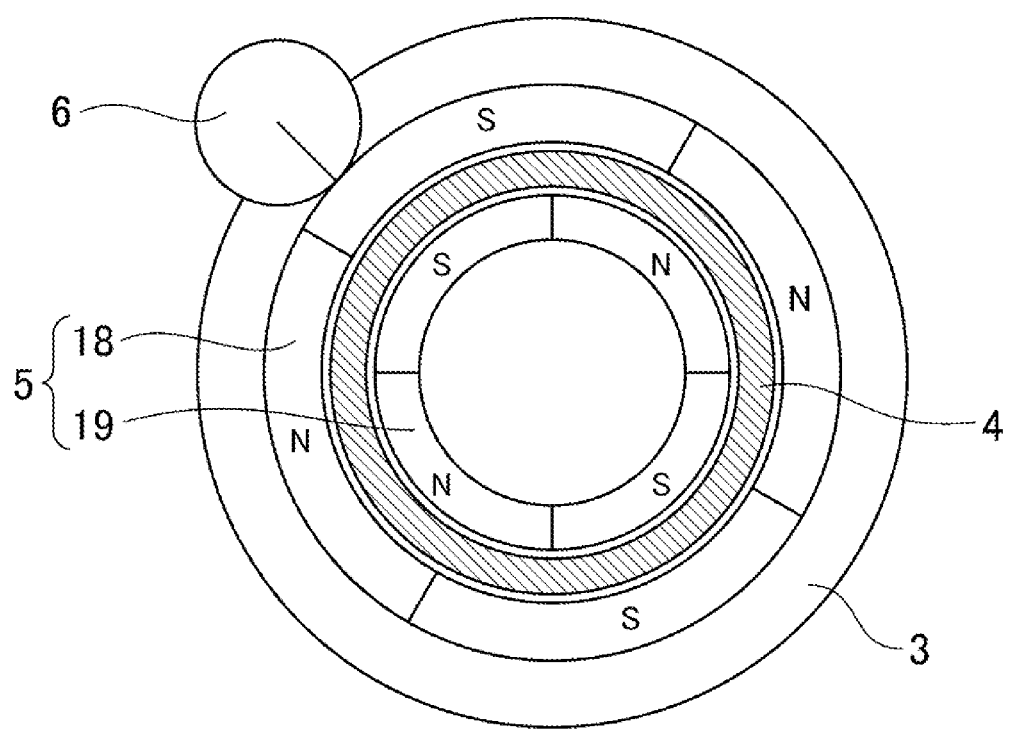
FIGS. 2A and 2B are views illustrating a configuration of the braking device according to one embodiment of the present disclosure or the braking device in the fishing reel.
Figure 2B:
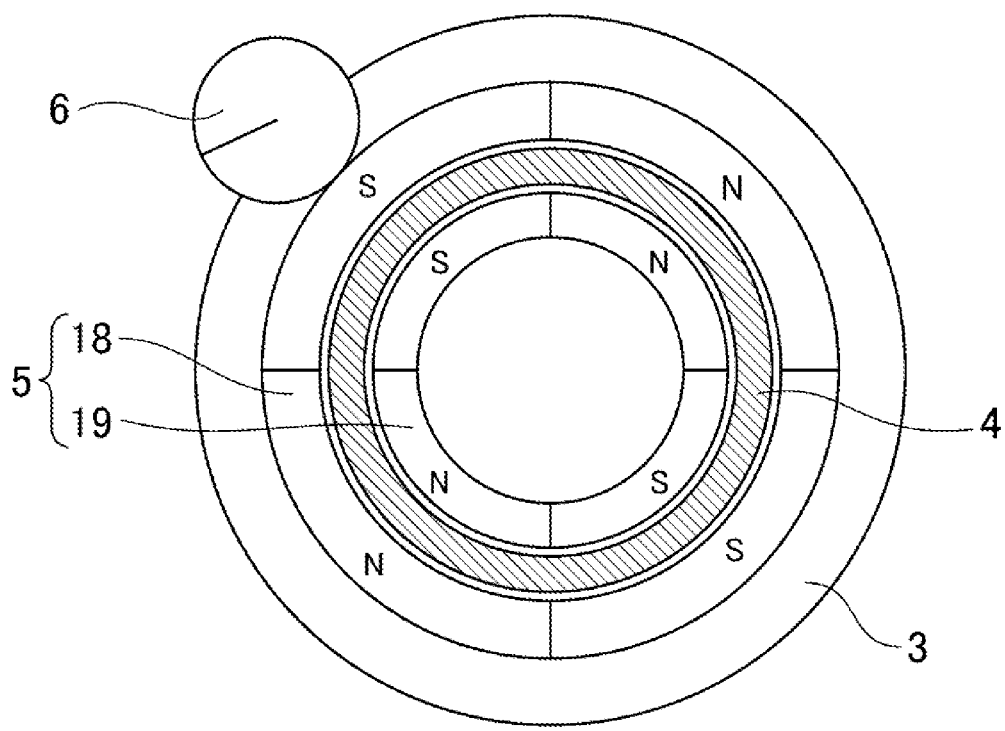

Next, a configuration of the braking device 10 according to one embodiment of the present disclosure or the braking device 10 in the fishing reel 1 is described with reference to FIGS. 2A to 4B. An example illustrated in FIGS. 2A and 2B is a case where an eddy current type brake is used as the braking device 10. In this example, the braking unit 5 is formed of a rotating magnet 18 and a fixed magnet 19, the rotating magnet 18 and the fixed magnet 19 form a magnetic circuit, and a magnetic field generated by the magnetic circuit penetrates an induct rotor (braked unit) 4 formed of a conductor. The induct rotor 4 is attached to the spool 3 and the braking force proportional to intensity of the magnetic field and a rotational speed of the spool 3 is generated. By providing a gear and the like, for example, as the output member 6, a rotational force from the output shaft described above is transmitted to the rotating magnet 18, so that the rotating magnet 18 may be rotated. By moving the rotating magnet 18 to a predetermined position (moving from a state in FIG. 2A to a state in FIG. 2B by rotation) in this manner, the braking force to the spool 3 may be adjusted.

Figure 3A:
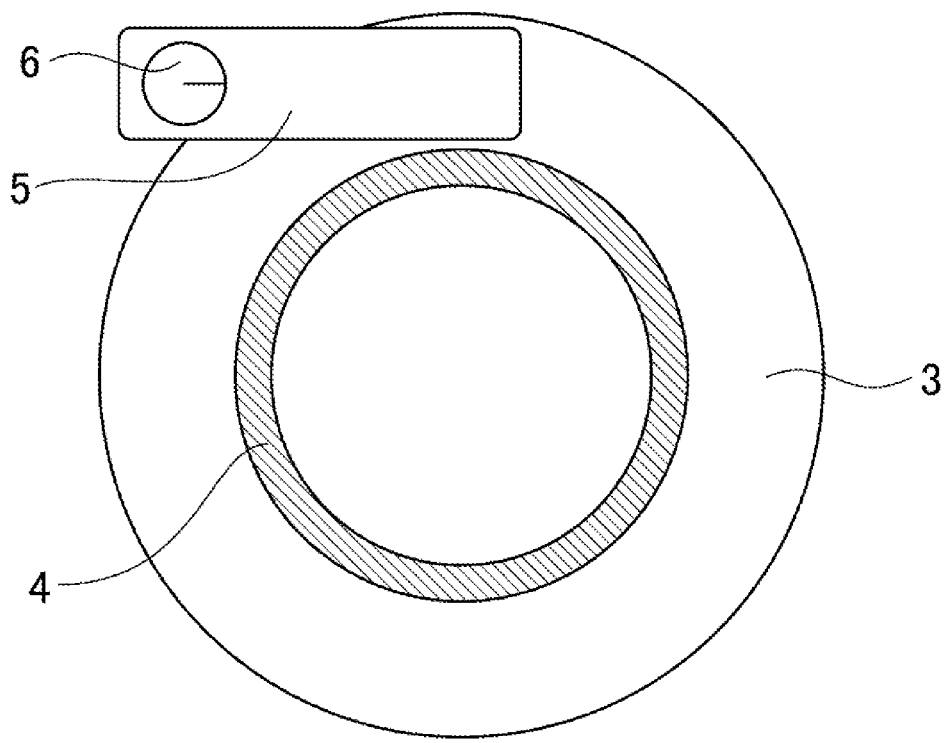
FIGS. 3A and 3B are views illustrating a configuration of the braking device according to one embodiment of the present disclosure or the braking device in the fishing reel.
Figure 3B:
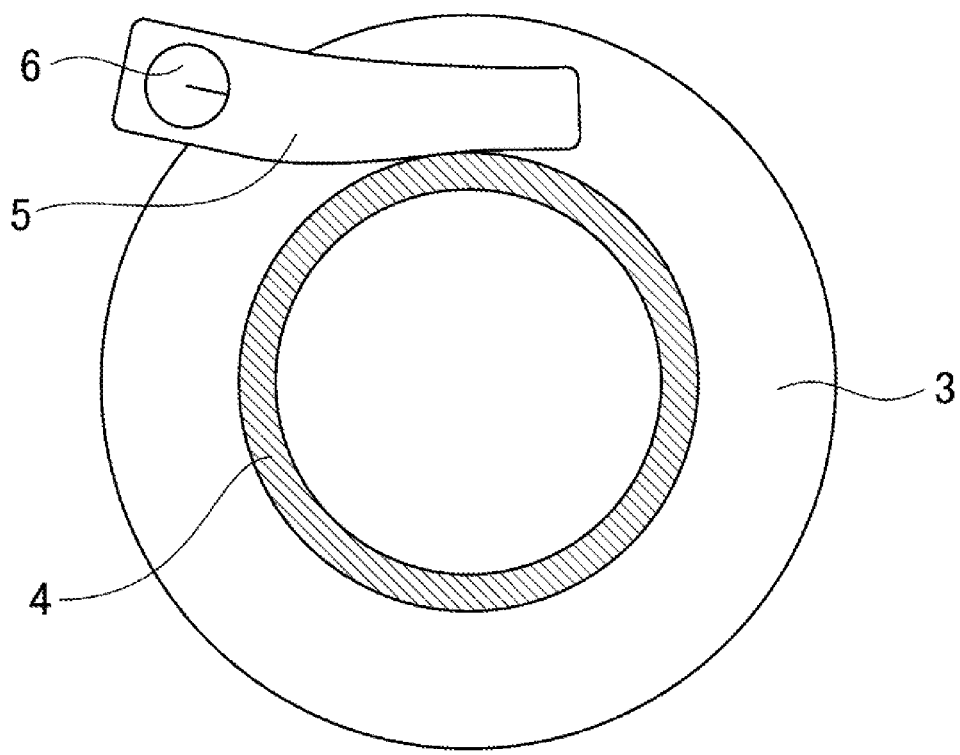

Next, an example illustrated in FIGS. 3A and 3B is a case where a friction type brake is used as the braking device 10. As illustrated, the braking member 5 (for example, an elastic frictional member) is provided at a tip of the output member 6 (or the output shaft 7). The braking member 5 may come into contact with the braked unit 4 attached to the spool 3. When the output member 6 (or the output shaft 7) is rotated, the braking member 5 comes into contact with the braked unit 4 according to a movement amount thereof, so that the braking member 5 is elastically deformed. A reaction force corresponding to an elastic deformation amount acts as a contact force between the braked unit 4 and the braking member 5. As a result, a frictional force is generated in the spool 3. Herein, the rotational movement amount of the output member 6 (or the output shaft 7) is proportional to the frictional force applied to the spool 3. In this manner, by moving (rotating) the output member 6 (or the output shaft 7) to a predetermined position, the braking force to the spool 3 may be adjusted.

Figure 4A:
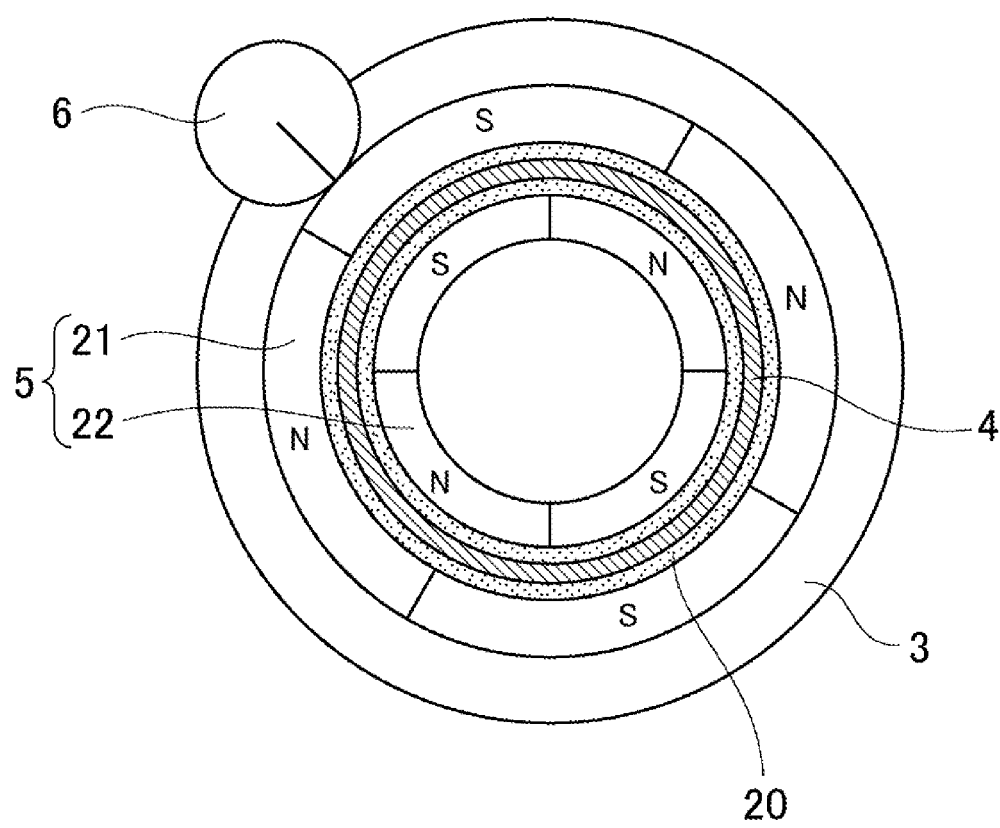
FIGS. 4A and 4B are views illustrating a configuration of the braking device according to one embodiment of the present disclosure or the braking device in the fishing reel.
Figure 4B:
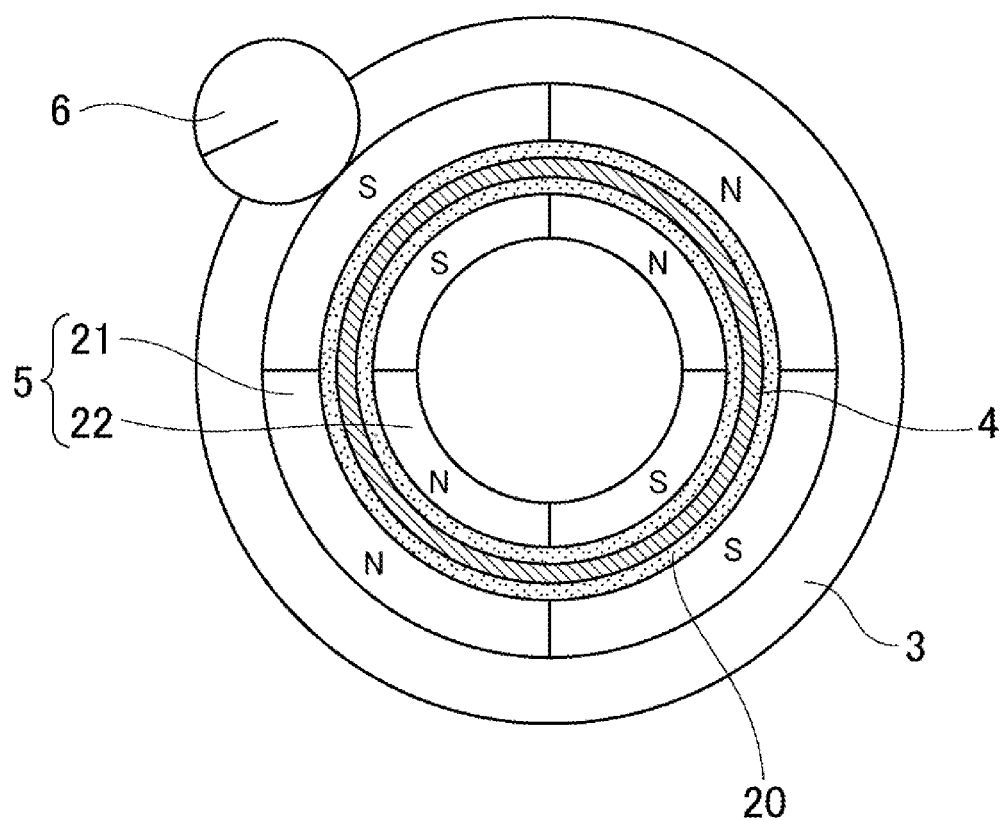

Next, an example illustrated in FIGS. 4A and 4B is a case where a magneto-rheological fluid type brake is used as the braking device 10. As illustrated, the spool 3 is provided with a cylindrical braked unit 4 (illustrated as circular because this is a cross section of the braked unit 4). The braked unit 4 is arranged in a space 20 filled with magneto-rheological fluid (MR fluid), so that this receives viscous resistance from the magneto-rheological fluid. The magneto-rheological fluid changes its viscosity depending on the magnetic field. As in the above-described case, a magnetic circuit is formed of a rotating magnet 21 and a fixed magnet 22, and a magnetic field generated by the magnetic circuit penetrates the magneto-rheological fluid. When the output member 6 rotates, the rotating magnet 21 may be rotated. By moving (rotating) the output member 6 to a predetermined position (moving from a state in FIG. 4A to a state in FIG. 4B by rotation), the braking force to the spool 3 may be adjusted. Note that, the braked unit 4 is desirably formed of a ferromagnetic material for improving the magnetic circuit, but may also be formed of a non-magnetic material.

In the braking device 10 according to one embodiment of the present disclosure or the braking device 10 in the fishing reel 1, the output member is rotated by the motor, and the braking force of the braking means is adjusted according to a rotational amount thereof. That is, it is possible to adjust the braking force acting on the spool by rotating the permanent magnet forming a part of the magnetic circuit of the eddy current type brake or rotating the braking member of the friction type brake. In this manner, since it is possible to transmit a mechanical transmission force from the output member, this may be used for various types of casting brakes.

In the braking device 10 according to one embodiment of the present disclosure or the braking device 10 in the fishing reel 1, since the output member is arranged outside the watertight structure, water may enter the braking unit, and the braking unit itself is not limited by a layout of the waterproof structure. For example, in a case of waterproofing the inside of the eddy current type brake, there may be a structure in which a waterproof wall is provided between the rotating magnet and the induct rotor, but in this case, a gap between the induct rotor and the rotating magnet is widened, so that the magnetic field to the inductor becomes weak, and it might be difficult to enhance the braking force.

Braking methods such as the eddy current type and the friction type are especially advantageous when a lightweight lure is casted (thrown) because the braking force may be applied even in a case where the control circuit is disconnected and it is not necessary to provide the magnet on the spool and low inertia may be realized, and furthermore, this has a characteristic not found in a power generation type brake; for example, this may apply the braking force independent from the rotational speed of the spool (friction type brake). When the braking methods may be electrically controlled, there is an advantage that the braking force may be adjusted at any time during casting (throwing), and variation of the braking force may be stored in a memory and the like.

In the waterproof unit (waterproof means) by packing and the like, in general, frictional resistance generated when the output shaft rotates increases as a waterproof capacity increases. In the braking device 10 according to one embodiment of the present disclosure or the braking device 10 in the fishing reel 1, power of the motor is boosted by the reduction gear to be transmitted to the output shaft, and the waterproof means is provided on the subsequent output shaft. As a result, an influence of the frictional resistance generated by the waterproof means on the motor becomes 1/reduction ratio. Therefore, the motor overcomes the frictional resistance and may stably rotate the output shaft, and since a smaller motor may be used, a technical effect of reducing power consumption may be obtained. In the braking device 10 according to one embodiment of the present disclosure or the braking device 10 in the fishing reel 1, since the board, the motor, and the gear are housed in one unit, there also is an advantage that a size of the reel is not increased.

A braking device of a double bearing reel according to one embodiment of the present disclosure brakes a spool rotatably mounted on a reel body, the braking device provided with a braked unit attached to the spool, a braking unit that applies a braking force to the braked unit, an output shaft that adjusts the braking force of the braking unit according to a rotational angle, a motor capable of driving the output shaft in forward and backward directions, a reduction mechanism that transmits power while decelerating from the motor to the output shaft, a control unit that controls the motor, and a power supply that supplies electric power to the motor, the braking device provided with a watertight case that houses the motor, the reduction mechanism, the control unit, and the power supply in a watertight manner, and a waterproof unit for waterproofing on the output shaft.

According to the braking device of the double bearing reel according to one embodiment of the present disclosure, it becomes possible to realize waterproofing of the control circuit capable of electrically adjusting the braking force. More specifically, also by using the braking device that transmits the mechanical force to the outside of the watertight structure, it is possible to realize waterproofing while avoiding an increase in size of the device.

In the braking device of the double bearing reel according to one embodiment of the present disclosure, the braked unit is a conductor, and the braking unit is a magnetic circuit formed of a permanent magnet, and the output shaft changes a magnetic field to the conductor by moving at least a part of the magnetic circuit. In this manner, it is possible to perform waterproofing in the eddy current type brake while avoiding an increase in size of the entire device.

In the braking device of the double bearing reel according to one embodiment of the present disclosure, the braked unit is a frictional member, the braking unit is a frictional braking unit that transmits a contact force to the frictional member, and the output shaft changes a contact force according to rotation. In this manner, it is possible to perform waterproofing the friction type brake while avoiding an increase in size of the entire device.

Herein, the frame (reel body) 2 may be attached to the fishing rod, and the fishing reel 1 includes an operation means (handle) not illustrated as is the case with a conventional fishing reel and may wind the fishing line when the spool 3 is rotated in a forward direction by a user operation. Rotation of the handle (not illustrated) is transmitted to the spool 3 by a transmission means such as a gear. The fishing reel 1 includes a clutch means (not illustrated), and a user may select connection and disconnection of power transmission to the spool 3 by operating the clutch means. In a connected state, winding by the operation means is possible. In a disconnected state, the spool 3 may be freely rotated in forward and backward directions, and the fishing line may be released.

The braking device 10 according to one embodiment of the present disclosure or the braking device 10 in the fishing reel 1 is provided with a clutch state detection unit (clutch state detection means) that detects a state of the clutch means, and it may be regarded that casting preparation is performed when the clutch switches from an engaged state to a disengaged state.

In the braking device of the double bearing reel according to one embodiment of the present disclosure, the watertight case further houses at least any one of a rotation detection unit that detects rotation of the spool, a position detection unit that detects a position of a reduction gear of the reduction mechanism, or a clutch state detection unit that detects a state of a clutch of the fishing reel. In this manner, it is possible to house a plurality of parts that requires waterproof treatment in one watertight structure, so that it is possible to avoid an increase in size of the entire device.

A fishing reel according to one embodiment of the present disclosure is provided with the braking device of the double bearing reel according to any one of the above. According to the fishing reel provided with the braking device according to one embodiment of the present disclosure, it becomes possible to realize waterproofing of the control circuit capable of electrically adjusting the braking force. More specifically, also by using the braking device that transmits the mechanical force to the outside of the watertight structure, it is possible to provide the reel that realizes waterproofing while avoiding an increase in size of the device.

Dimensions, materials, and arrangements of the components described in this specification are not limited to those explicitly described in the embodiment, and the components may be modified to have any dimensions, materials, and arrangements that may fall within the scope of the present disclosure. Components not explicitly described in this specification may be added to the described embodiment, or some of the components described in each embodiment may be omitted.

What is claimed is:

1. A braking device of a double bearing reel that brakes a spool rotatably mounted on a reel body of the double bearing reel, the braking device comprising:
   a braked unit attached to the spool;
   a braking unit that applies a braking force to the braked unit;
   an output shaft that adjusts the braking force of the braking unit according to a rotational angle;
   a motor capable of driving the output shaft in forward and backward directions;
   a reduction mechanism that transmits power while decelerating from the motor to the output shaft;
   a control unit that controls the motor; and
   a power supply that supplies electric power to the motor, the braking device of the double bearing reel provided with:
   a watertight case that houses the motor, the reduction mechanism, the control unit, and the power supply in a watertight manner; and
   a waterproof unit for waterproofing on the output shaft.

2. The braking device according to claim 1, wherein the braked unit is a conductor, and the braking unit is a magnetic circuit formed of a permanent magnet, and the output shaft changes a magnetic field to the conductor by moving at least a part of the magnetic circuit.

3. The braking device according to claim 1, wherein the braked unit is a frictional member, the braking unit is a frictional braking unit that transmits a contact force to the frictional member, and the output shaft changes a contact force according to rotation.

4. The braking device according to claim 1, wherein the watertight case further houses at least any one of a rotation detection unit that detects rotation of the spool, a position detection unit that detects a position of a reduction gear of the reduction mechanism, or a clutch state detection unit that detects a state of a clutch of the fishing reel.

5. A fishing reel comprising:
   the braking device according to claim 1.

* * * * *